UNITED STATES PATENT OFFICE.

ALBERT L. CLAPP, OF MARBLEHEAD, MASSACHUSETTS, ASSIGNOR TO THE METALITE COMPANY, OF AMESBURY, MASSACHUSETTS, A CORPORATION OF DELAWARE.

COUNTER-BOARD AND PROCESS OF MAKING THE SAME.

1,332,541.      Specification of Letters Patent.      Patented Mar. 2, 1920.

No Drawing.      Application filed June 28, 1917. Serial No. 177,600.

*To all whom it may concern:*

Be it known that I, ALBERT L. CLAPP, a citizen of the United States, and a resident of Marblehead, county of Essex, and State of Massachusetts, (whose post-office address is 38 Devereux street, Marblehead, Massachusetts,) have invented an Improvement in Counter-Boards and Processes of Making the Same, of which the following description, in connection with the accompanying drawings, is a specification, like characters on the drawings representing like parts.

This invention relates to an improved process of making hard fiber-board, such as counter-board, and to the improved product of said process.

For carrying out my process, I use cellulose and more particularly cellulose which has undergone some form of treatment, such as so-called soft stock.

Heretofore, so-called raw or hard stock, including such materials as Manila rope, old hemp rope, jute, raw flax, etc., have been used as the basic material in the manufacture of hard fiber-board. So far as I am aware, however, so-called soft stock, that is to say, fibrous cellulose which has already undergone some treatment, such as wood pulp, scrap papers, etc., has never been used for the manufacture of hard fiber-board such as counter-board.

While by the use of hard stock in the manufacture of hard fiber-board, a very high grade fiber-board has been produced, that is to say, one possessing the desired degree of hardness, intimate connection of the fibers and wear-resisting qualities, the process is open to the objection that it requires a long treatment to effect the necessary beating out of the cellulose fibers and the necessary hydration thereof, anywhere for twelve to twenty-four hours being required for this purpose alone. One of the objects of my invention is materially to reduce the length of time required to produce the necessary hydration of the material used.

As already stated, so far as I am aware, so-called soft stock has never been used for the manufacture of hard fiber-board, it having been found unsuited for that purpose. This is due in part to the fact that, as the fibers of the soft stock material have already undergone a certain amount of treatment, the beating out process to which the soft stock is subjected in the preparation of fiber-board, owing to the length to which said process had to be prolonged in the processes heretofore used to produce the necessary hydration, broke up the fibers to such an extent that a fiber-board possessing the necessary or desired degree of hardness and strength could not be produced by the use of soft stock. That is to say, in order to produce the necessary hydration of the stock, the beating out process had to be prolonged to such a degree that the already partially disintegrated or separated fibers became so disintegrated and broken up that the material was no longer suitable for the production of a hard fiber-board, such as counter-board, for example.

My improved process by materially shortening the length of treatment required to obtain the necessary degree of hydration, overcomes this difficulty and renders soft stock not only available but also highly desirable for the manufacture of hard fiber-board, and the hard fiber-board or counter-board produced by my improved process is eminently adapted for use in the manufacture of counters, trunks, suit cases and inner soles requiring a hard fiber-board.

The invention will best be understood from the following description of one illustrative product of my improved process and of the best mode or manner known to me for practising such process, while its scope will be more particularly pointed out in the appended claims.

In carrying out my process, the soft stock is treated in water with a suitable alkali, preferably caustic soda, the caustic soda being thoroughly mixed with the stock and the treatment being carried out at a relatively low temperature. I have found in practice that the best results are secured when the temperature is kept below 70° F. Under these conditions, the caustic soda causes the soft stock to swell and thus absorb a greater quantity of water than it otherwise would. That is to say, the hydration of the stock is materially increased and accelerated. This is an important feature, for when the stock has been formed into sheets and is then dried, the giving up of the large amount of water thus absorbed causes the material of which a sheet is formed to shrink or coalesce into a closely knit, extremely compact, homogeneous mass, and imparts to the finished counter-board the required degree of hardness.

In carrying out my process, the soft stock is reduced to a finely divided state or caused to disintegrate, in the water, and this will preferably be done after the addition of the caustic soda. To give the desired color to the finished counter-board, I add to the mixture the necessary coloring matter, and a certain quantity of sizing may also be added to act as a sort of stiffener and render the finished counter-board more or less water-resistant.

After the stock has been reduced to the required degree of fineness, it is formed into sheets in any suitable manner and these are then dried and, if desired, calendered.

I will now proceed to describe more in detail one preferred manner of carrying out my process, it being understood that the order and mode of procedure and the ingredients and quantities of the latter used may be varied within certain limits according to different conditions and the results that it is desired to obtain.

The reduction of the stock to a finely divided state may be effected by any suitable means and in any suitable manner, but I preferably use for this purpose a beater-engine of any usual or well-known construction.

A certain amount of water, sufficient to enable the stock that is to be added to circulate freely, is introduced into the beater-engine, and while the water is in circulation, 400 pounds of kraft pulp, 100 pounds of some suitable pigment, such as red pigment, and 400 pounds of Manila papers, mixed papers or sulfate screenings, are added and the mixture is allowed to circulate until the admixture is complete, and the pulp begins to disintegrate or come apart in the water. Fifteen to twenty pounds of caustic soda is then added to cause the more rapid hydration of the stock. The caustic soda also causes the stock to wet up or, as paper manufacturers express it, to get the greasy feeling. The material is now beat up very hard by bringing the roll and bed plate of the beater engine very close together and beating out the mixture for two or three hours to cause the soft stock to become very finely disintegrated or divided.

One hundred to one hundred and fifty pounds of some suitable size, such as resin size, may now be added and allowed to mix in for fifteen minutes or half an hour. I then add some suitable substance containing tannin, for example 100 pounds of tanning extract which contains about 15% of tannin. This is allowed to mix in with the other ingredients for about fifteen to thirty minutes, whereupon I add from 35 to 40 pounds of some metal salt that will form with the tannin an insoluble tannate of dark color. I have found iron sulfate or copperas eminently suited to this purpose. The tannin combines with the copperas to form tannate of iron which is insoluble and is deposited on the fibers of the stock, thus giving the mixture a very dark color, and in combination with the red pigment or oxid of iron previously added, produces a pulp of a very dark, rich brown color. One hundred pounds of sulfate of aluminum may now be added which causes a precipitate of aluminum resinate by combining with the resin size previously added. This acts as a stiffener and causes the finished counter-board to be more or less water-repellent. It also causes the fibers of the fibrous mass to adhere. The stock is now beaten out to the desired degree of fineness and is then thinned down to the desired degree by the addition of water and is made into sheets. This may be done in any suitable manner, but I preferably employ for this purpose a wet machine of any usual or well-known construction. The sheets of fiber-board thus obtained may be dried in any suitable manner as by hanging them upon a drier or causing them to pass between successive pairs of rollers; and to accelerate the process of drying, the space within which the drying operation takes place or the rollers may be heated, or the heat may be applied in any other suitable manner. The sheets may then be calendered in any suitable manner and if necessary trimmed. The sheets will preferably be maintained flat while drying.

In place of tannin, I may use lamp black in combination with the red pigment to obtain the desired color. In that case the copperas or equivalent metal salt will be omitted. Or I may use an extract from cedar bark to furnish the necessary tannin to coact with the copperas. Tanned leather or a certain residue known as pharmaceutical residue may also be used, as they contain sufficient tannin to give the necessary reaction in combination with the sulfate of iron. When bark is used, it is introduced into the beating out engine after the pulp and no alkali is added to the mixture, as the bark has already been mixed and cooked up with alkali.

It will be seen that by my process a high-grade, hard counter-board can be manufactured in much less time than has heretofore been required in making counter-board from hard stock by processes heretofore in use. In using hard stock, the latter must first be bleached, washed and then cooked to free it from all foreign matter before it can be used for the manufacture of fiber-board, all of which preliminary treatment is eliminated by the use of soft stock. My process, therefore, represents a great saving both in time and expense.

The counter-board produced by my process is of a uniformly homogeneous, closely knit and compact structure throughout and possesses the required degree of hardness and the rich dark color so much desired. It possesses all the requirements of a perfect counter-board to a degree heretofore unattained so far as I am aware.

While I have herein described, for purposes of illustration, the steps in detail by which one form of my process may be carried out, it is to be understood that the invention is not limited to the exact details specified, but that said details may be varied within suitable limits without departing from the spirit of the invention.

Claims:

1. That process for making counter-board, which is characterized by treating fibrous cellulose with alkali without the application of heat; forming the stock thus obtained into sheets; and drying said sheets.

2. That process for making counter-board, which is characterized by treating fibrous cellulose with alkali at a relatively low temperature; forming the stock thus obtained into sheets; and drying said sheets.

3. That process for making counter-board, which is characterized by treating fibrous cellulose in water with alkali at a temperature below 70° F.; forming the stock thus obtained into sheets; and drying said sheets.

4. That process for making counter-board, which is characterized by treating fibrous cellulose in water with an alkali without the application of heat; reducing the fibrous cellulose to a relatively finely divided state; making the stock thus obtained into sheets; and drying said sheets.

5. That process for making counter-board, which as characterized by treating fibrous cellulose in water with an alkali without the application of heat; beating out the fibrous cellulose to reduce it to a relatively finely divided fibrous state; forming the stock thus obtained into sheets; and drying said sheets.

6. That process for making counter-board, which is characterized by treating fibrous cellulose in water with alkali at a temperature below 70° F., to cause hydration thereof and with a suitable coloring matter; forming the stock thus obtained into sheets; and drying said sheets.

7. That process for making counter-board, which is characterized by treating fibrous cellulose in water with alkali at a temperature below 70° F., to cause hydration thereof and with a suitable coloring matter and sizing material; forming the stock thus obtained into sheets; and drying said sheets.

8. That process for making counter-board, which is characterized by treating fibrous cellulose in water with alkali at a temperature below 70° F., to cause hydration thereof and with a suitable coloring matter; beating out the mixture; forming the stock thus obtained into sheets; and drying said sheets.

9. That process for making counter-board, which is characterized by treating fibrous cellulose in water with alkali, at a temperature below 70° F., to cause hydration thereof and with a suitable coloring matter and sizing material; beating out the mixture; forming the stock thus obtained into sheets; and drying said sheets.

10. That process for making counter-board, which is characterized by treating so-called soft stock in water with an alkali at a temperature below 70° F.; beating out the mixture thus obtained; forming the stock thus produced into sheets; and drying said sheets.

11. That process for making counter-board, which is characterized by treating so-called soft stock in water with alkali, at a temperature below 70° F., to cause hydration thereof and with a suitable coloring matter and beating out said soft stock; forming the beaten out stock thus obtained into sheets; and drying said sheets.

12. That process for making counter-board, which is characterized by treating so-called soft stock in water with alkali, at a temperature below 70° F., to cause hydration thereof and with a suitable coloring matter and sizing material and beating out said soft stock; forming the beaten out stock thus obtained into sheets; and drying said sheets.

13. That process for making counter-board, which is characterized by treating so-called soft stock in water with alkali, at a temperature below 70° F., to cause hydration thereof, coloring said stock by precipitating upon the fibers thereof a suitable coloring matter in the form of an insoluble metallic salt and beating out said soft stock; forming the beaten out stock thus obtained into sheets; and drying said sheets.

14. That process for making counter-board, which is characterized by treating so-called soft stock in water with alkali, at a temperature below 70° F., to cause hydration thereof, coloring said stock by precipitating upon the fibers thereof a suitable coloring matter in the form of an insoluble matallic salt, adding a metallic resinate and beating out said soft stock and mixing thoroughly; forming the stock thus obtained into sheets; and drying said sheets.

15. That process for making counter-board, which is characterized by treating so-called soft stock in water with alkali, at a temperature below 70° F., to cause hydration thereof, adding a suitable sizing material and beating out said soft stock and mixing thoroughly; forming the stock thus obtained into sheets; and drying said sheets.

16. That process for making counter-board, which is characterized by treating so-called soft stock in water with alkali, at a temperature below 70° F., to cause hydration thereof, coloring said stock by adding a suitable pigment and precipitating upon the fibers of the stock a suitable coloring matter in the form of an insoluble metallic salt and beating out said soft stock; forming the beaten out stock thus obtained into sheets; and drying said sheets.

17. That process for making counter-board, which is characterized by treating so-called soft stock in water with alkali, at a temperature below 70° F., to cause hydration thereof, coloring said stock by precipitating upon the fibers thereof a suitable coloring matter in the form of an insoluble metallic tannate and beating out said soft stock; forming the beaten out stock thus obtained into sheets; and drying said sheets.

18. That process for making counter-board, which is characterized by treating so-called soft stock in water with alkali, at a temperature below 70° F., to cause hydration thereof, coloring said stock by the addition of a suitable pigment and precipitating upon the fibers of the stock a suitable coloring matter in the form of an insoluble metallic tannate and beating out said soft stock; forming the beaten out stock thus obtained into sheets; and drying said sheets.

19. That process for making counter-board, which is characterized by treating so-called soft stock in water with alkali, at a temperature to cause hydration thereof, coloring said stock by adding a suitable pigment and precipitating upon the fibers of the stock a suitable coloring matter in the form of an insoluble tannate, adding a suitable sizing material and beating out said soft stock and mixing thoroughly; forming the stock thus obtained into sheets; and drying said sheets.

20. That process for making counter-board, which is characterized by treating so-called soft stock in water with alkali, at a temperature to cause hydration thereof, coloring said stock by intermixing therewith a suitable pigment and precipitating upon the fibers of the stock a suitable coloring matter in the form of an insoluble tannate, adding a suitable sizing material in the form of a metallic resinate and beating out said soft stock and mixing thoroughly; forming the stock thus obtained into sheets; and drying said sheets.

21. That process for making counter-board, which is characterized by beating out 800 pounds of so-called soft stock in water and intimately mixing therewith 100 pounds of red pigment, 100 to 150 pounds of resin size, 100 pounds of tannin extract, 35 to 40 pounds of iron sulfate and 100 pounds of sulfate of aluminum; forming the mixture or stock thus obtained into sheets; and drying said sheets; the soft stock being treated, at some time during the process before making it into sheets, with 15 to 20 pounds of caustic alkali at a temperature to produce hydration thereof.

22. As an article of manufacture, counter-board made up of a homogeneous, closely compacted fibrous mass of hydrated and then dehydrated cellulose fibers having deposited thereon and intimately intermixed therewith a metallic tannate.

23. As an article of manufacture, counter-board made up of a homogeneous, closely compacted fibrous mass of hydrated and then dehydrated cellulose fibers having intimately intermixed therewith coloring matter comprising a metallic tannate and suitable pigment.

24. As an article of manufacture, counter-board made up of a homogeneous, closely compacted, fibrous mass of cellulose fibers treated in water with caustic alkali at a temperature to produce hydration thereof and then dehydrated by drying.

25. As an article of manufacture, counter-board made up of a homogeneous, closely compacted, fibrous mass of cellulose fibers treated in water with caustic alkali at a temperature to produce hydration thereof and then dehydrated by drying, and having deposited upon the fibers and intimately intermixed therewith a suitable coloring matter.

26. As an article of manufacture, counter-board made up of a homogeneous, closely compacted, fibrous mass of cellulose fibers treated in water with caustic alkali at a temperature to produce hydration thereof and then dehydrated by drying, and having deposited upon the fibers and intimately intermixed therewith a suitable coloring matter and sizing.

27. As an article of manufacture, counter-board made up of a homogeneous, closely compacted, fibrous mass of beaten out soft stock treated in water with caustic alkali at a temperature to produce hydration thereof and then dehydrated by drying.

28. As an article of manufacture, counter-board made up of a homogeneous, closely compacted, fibrous mass of beaten out soft stock treated in water with caustic alkali at a temperature to produce hydration thereof and then dehydrated by drying, and having deposited upon the fibers and intimately intermixed therewith a suitable coloring matter.

29. As an article of manufacture, counter-board made up of a homogeneous, closely compacted, fibrous mass of beaten out soft stock treated in water with caustic alkali at a temperature to produce hydration thereof and then dehydrated by drying, and having deposited upon the fibers and intimately intermixed therewith a suitable coloring matter and sizing.

In testimony whereof, I have signed my name to this specification.

ALBERT L. CLAPP.